US012772254B2

(12) United States Patent
Liu

(10) Patent No.: US 12,772,254 B2
(45) Date of Patent: Oct. 20, 2026

(54) METHOD AND APPARATUS FOR CHANNEL MONITORING, STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 312 days.

(21) Appl. No.: 18/579,656

(22) PCT Filed: Jul. 16, 2021

(86) PCT No.: PCT/CN2021/106905

§ 371 (c)(1),
(2) Date: Jan. 16, 2024

(87) PCT Pub. No.: WO2023/283952

PCT Pub. Date: Jan. 19, 2023

(65) Prior Publication Data

US 2024/0349293 A1 Oct. 17, 2024

(51) Int. Cl.
*H04W 72/23* (2023.01)
*H04W 52/02* (2009.01)
(Continued)

(52) U.S. Cl.
CPC ..... *H04W 72/231* (2023.01); *H04W 52/0274* (2013.01); *H04W 74/0833* (2013.01); *H04W 76/28* (2018.02)

(58) Field of Classification Search
CPC . H04W 72/23; H04W 76/28; H04W 52/0216; H04W 76/27; H04W 24/08;
(Continued)

(56) References Cited

U.S. PATENT DOCUMENTS

2010/0002665 A1 1/2010 Oguchi
2011/0212742 A1 9/2011 Chen et al.
(Continued)

FOREIGN PATENT DOCUMENTS

CN 101030809 A 9/2007
CN 101489291 A 7/2009
(Continued)

OTHER PUBLICATIONS

International Search Report issued Mar. 28, 2022 in PCT/CN2021/106905, filed on Jul. 16, 2021,4 pages (With English Translation).
(Continued)

*Primary Examiner* — Sai Aung
(74) *Attorney, Agent, or Firm* — Oblon, McClelland, Maier & Neustadt, L.L.P.

(57) ABSTRACT

The present disclosure provides a method and an apparatus for channel monitoring, and a non-transitory storage medium. The method includes broadcasting at least one configuration information, where the configuration information is configured to configure one periodicity duration for discontinuously transmitting a physical downlink control channel PDCCH, determining to enter an energy-saving transmission mode for discontinuously transmitting the PDCCH, and transmitting first indication information to a terminal in a connected state, where the first indication information is configured to activate first configuration information in the at least one configuration information.

17 Claims, 17 Drawing Sheets

(51) Int. Cl.
*H04W 72/231* (2023.01)
*H04W 74/0833* (2024.01)
*H04W 76/28* (2018.01)

(58) Field of Classification Search
CPC . H04W 72/21; H04W 52/0235; H04W 48/12; H04W 72/0446
See application file for complete search history.

(56) References Cited

U.S. PATENT DOCUMENTS

| | | | | |
|---|---|---|---|---|
| 2013/0215809 | A1* | 8/2013 | Chang | H04W 76/28 370/311 |
| 2013/0258919 | A1 | 10/2013 | Damnjanovic | |
| 2014/0335858 | A1 | 11/2014 | Lee et al. | |
| 2018/0220341 | A1* | 8/2018 | Dai | H04W 36/0079 |
| 2020/0120596 | A1* | 4/2020 | Yu | H04W 52/0216 |
| 2020/0413341 | A1* | 12/2020 | Xu | H04W 52/0229 |
| 2021/0084516 | A1* | 3/2021 | Rungta | H04W 24/10 |
| 2022/0053530 | A1* | 2/2022 | Ahmed | H04W 76/28 |
| 2022/0272629 | A1* | 8/2022 | Zhao | H04W 52/0216 |
| 2022/0286966 | A1* | 9/2022 | Zhao | H04W 68/00 |

FOREIGN PATENT DOCUMENTS

| | | | |
|---|---|---|---|
| CN | 101742618 | A | 6/2010 |
| CN | 104025668 | A | 9/2014 |
| CN | 104219740 | A | 12/2014 |
| CN | 104219774 | A | 12/2014 |
| CN | 104509179 | A | 4/2015 |
| CN | 108184263 | A | 6/2018 |
| CN | 112088541 | A | 12/2020 |
| CN | 112399532 | A | 2/2021 |
| CN | 112449760 | A | 3/2021 |
| WO | WO 2014/101043 | A1 | 7/2014 |
| WO | WO 2014/121518 | A1 | 8/2014 |
| WO | WO 2020/223924 | A1 | 11/2020 |
| WO | WO 2021/120014 | A1 | 6/2021 |

OTHER PUBLICATIONS

Chinese Office Action issued May 20, 2023 in CN Application 202180002146.8, 28 pages (With English Translation).

Chinese Notice of Allowance issued Jan. 5, 2024 in CN Application 202180002146.8, 10 pages (With English Translation).

* cited by examiner

METHOD AND APPARATUS FOR CHANNEL MONITORING, STORAGE MEDIUM

CROSS-REFERENCE TO RELATED APPLICATIONS

The present application is a U.S. National Stage of International Application No. PCT/CN2021/106905, filed on Jul. 16, 2021, the entire content of which is incorporated herein by reference for all purposes.

BACKGROUND

Technical Field

The present disclosure relates to a field of communication, and more particularly, to a method and an apparatus for channel monitoring, and a non-transitory storage medium.

Description of the Related Art

3GPP (3rd Generation Partnership Project) has conducted a lot of discussions on terminal energy saving. However, these current discussions are mostly focused on a terminal, and regarding energy saving in a network-side device, further exploration is still needed.

SUMMARY

According to a first aspect of embodiments of the present disclosure, a method for channel monitoring is provided, the method is performed by a base station and includes:

- broadcasting at least one configuration information, where the configuration information is configured to configure one periodicity duration for discontinuously transmitting a physical downlink control channel PDCCH, determining to enter an energy-saving transmission mode for discontinuously transmitting the PDCCH, and transmitting first indication information to a terminal in a connected state, where the first indication information is configured to activate first configuration information in the at least one configuration information.

According to a second aspect of embodiments of the present disclosure, a method for channel monitoring, the method is performed by a terminal and includes receiving at least one configuration information broadcast by a base station, where the configuration information is configured to configure one periodicity duration for discontinuously transmitting a physical downlink control channel PDCCH, receiving first indication information transmitted by the base station, where the first indication information is configured to activate first configuration information in the at least one configuration information, determining, based on the first indication information, that the base station enters an energy-saving transmission mode, and discontinuously monitoring, based on the first configuration information, the PDCCH.

According to a third aspect of embodiments of the present disclosure, a communication device is provided and includes a processor and a memory for storing instructions executable by the processor. The processor is configured to perform any of the above methods for channel monitoring applied to the base station side.

According to a fourth aspect of embodiments of the present disclosure, a communication device is provided and includes a processor and a memory for storing instructions executable by the processor. The processor is configured to perform any of the above methods for channel monitoring applied to the terminal side.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings herein, which are incorporated in and constitute a part of the specification, illustrate examples consistent with the present disclosure, and together with the specification, serve to explain the principles of the present disclosure.

DETAILED DESCRIPTION OF THE PREFERRED EMBODIMENTS

Figure 1:
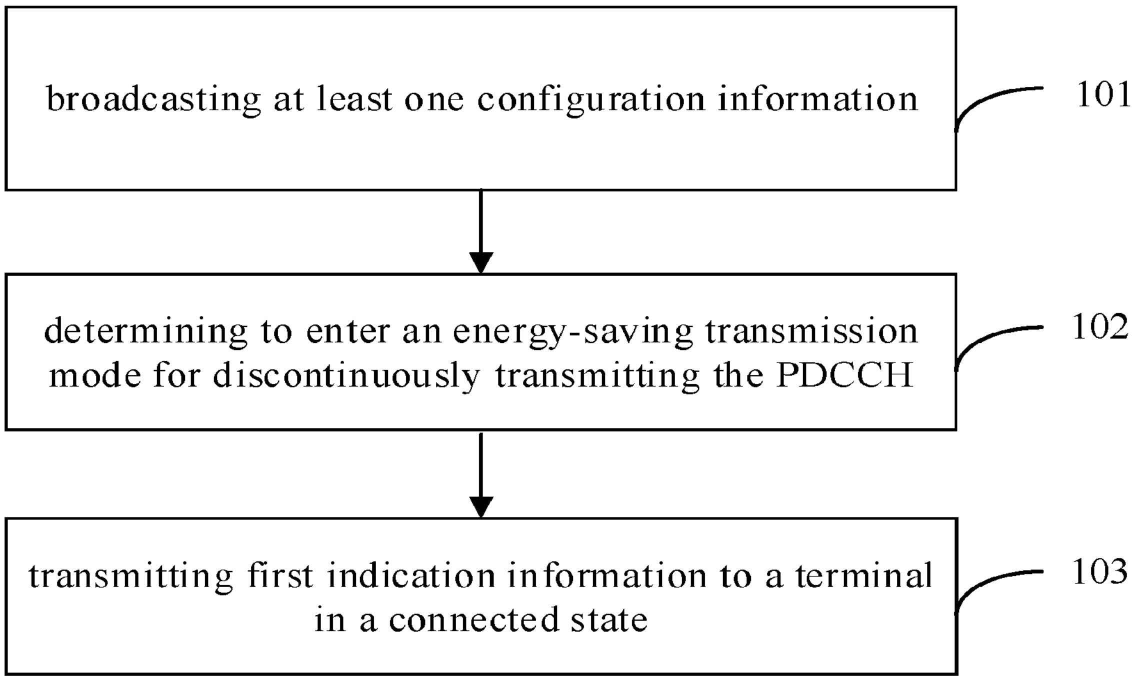
FIG. 1 is a schematic flowchart of a method for channel monitoring according to an embodiment.

Embodiments will be described in detail herein, with the illustrations thereof represented in the drawings. When the following descriptions involve the drawings, same numerals in different drawings refer to the same or similar elements unless otherwise indicated. The implementation described in the following embodiments do not represent all embodiments consistent with the present disclosure. Rather, they are merely examples of apparatuses and methods consistent with some aspects of the present disclosure as detailed in the appended claims.

The terms used in the present disclosure are only for the purpose of describing specific examples and are not intended to limit the present disclosure. The singular forms "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", etc. may be used in the present disclosure to describe various information, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used herein may be interpreted as "on the condition that" or "when" or "in response to determining".

To overcome problems existing in the related art, embodiments of the present disclosure provides a method and an apparatus for channel monitoring, and a non-transitory storage medium, for application in 5G (5th Generation Mobile Communication Technology) NR (New Radio) scenarios. Of course, it may also be applied in future 6G scenarios, which is not limited in the present disclosure. The present disclosure aims to save energy consumption of a base station by discontinuously transmitting PDCCH.

A method for channel monitoring provided in the present disclosure is first introduced below from a base station side.

Embodiments of the present disclosure provide the method for channel monitoring, as shown in FIG. 1. FIG. 1 is a flowchart of a method for channel monitoring according to an embodiment, which may be used for a base station, and the method may include the following steps 101 to 103.

In step 101, at least one configuration information is broadcast. In the embodiments of the present disclosure, the configuration information is configured to configure one periodicity duration for discontinuously transmitting a PDCCH (Physical Downlink Control Channel). In a case that the base station broadcasts a plurality of configuration information, the periodicity duration for discontinuously transmitting the PDCCH configured by each configuration information may be different.

In an embodiment, the base station may broadcast system information including at least one configuration information.

In step 102, it is determined to enter an energy-saving transmission mode for discontinuously transmitting the PDCCH. In an embodiment, the base station may determine to enter the energy-saving transmission mode for discontinuously transmitting the PDCCH in a case of low system load. The case of low system load includes but is not limited to, a case that a system load is relatively low, and/or a case that a system service volume is relatively low.

In step 103, first indication information is transmitted to a terminal in a connected state. In the embodiments of the present disclosure, the first indication information is configured to activate first configuration information in the at least one configuration information.

In an embodiment, the first indication information may be DCI (Downlink Control Information). That is, the base station informs the terminal of the first configuration information in effect through the DCI. In an embodiment, the first indication information may include but is not limited to paging DCI, PEI (Permanent Equipment Identifier) based DCI.

For example, the base station broadcasts three configuration information, and correspondingly configured periodicity durations for discontinuously transmitting the PDCCH are t1, t2, and t3, respectively. After entering the energy-saving transmission mode, the base station indicates to activate the first configuration information in the above three configuration information through the first indication information, i.e., the DCI. Assuming that a periodicity duration corresponding to the first configuration information is t3, the terminal discontinuously monitors the PDCCH according to the periodicity duration t3.

In the above embodiment, the base station may first broadcast at least one configuration information, the configuration information is configured to configure one periodicity duration for discontinuously transmitting the physical downlink control channel PDCCH. Furthermore, after entering the energy-saving transmission mode for discontinuously transmitting the PDCCH, the base station transmits the first indication information to the terminal in the connected state, activates the first configuration information in the at least one configuration information through the first indication information. The terminal may discontinuously monitor the PDCCH based on the first configuration information. In the present disclosure, the base station may transmit the PDCCH discontinuously, so as to achieve the purpose of saving the energy consumption of the base station.

Figure 2:
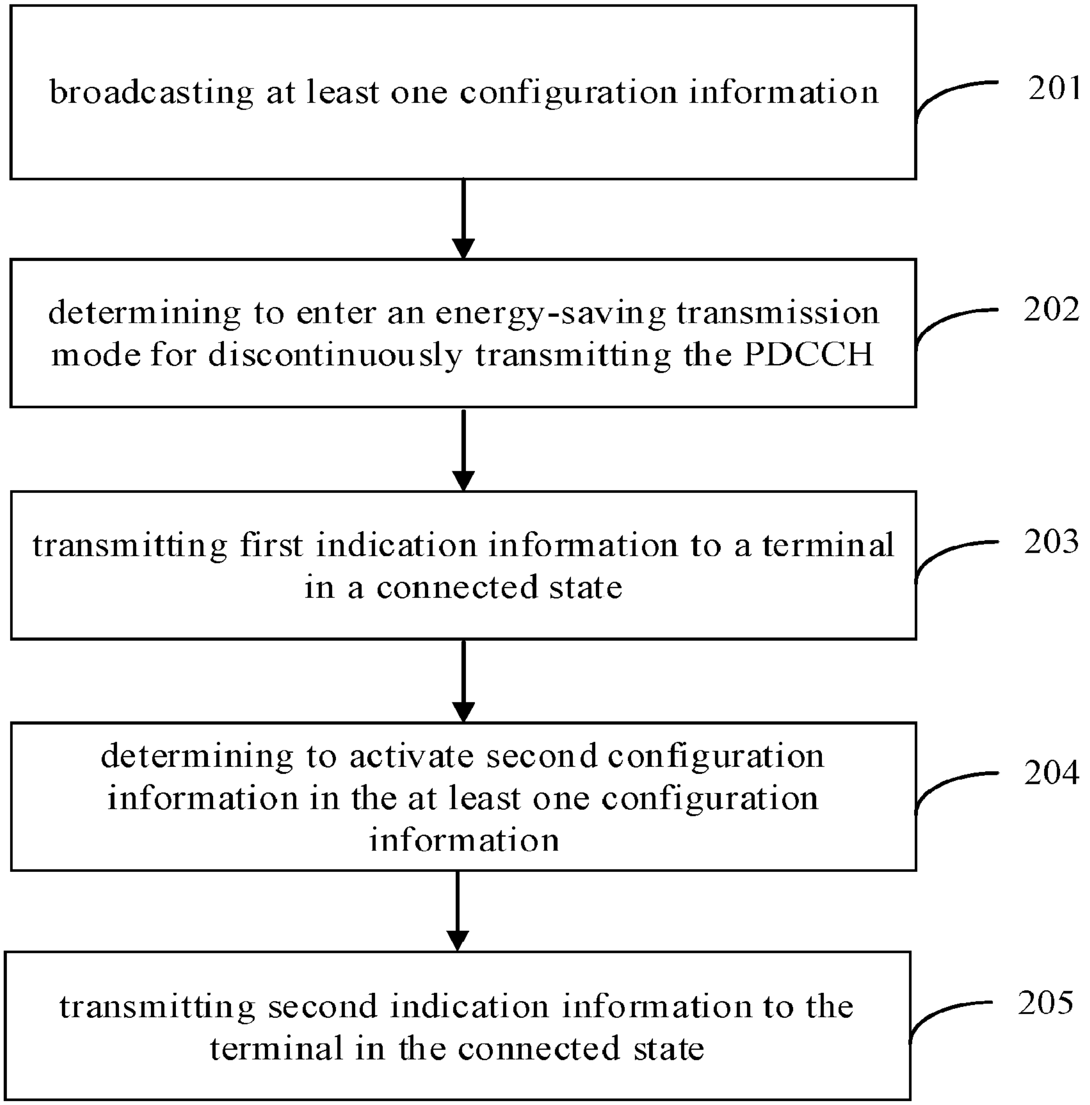
FIG. 2 is a schematic flowchart of another method for channel monitoring according to an embodiment.

In some embodiments, referring to FIG. 2, FIG. 2 is a flowchart of a method for channel monitoring according to an embodiment, which may be used for a base station, and the method may include the following steps 201 to 205:

In step 201, at least one configuration information is broadcast. In the embodiments of the present disclosure, the configuration information is configured to configure one periodicity duration for discontinuously transmitting a PDCCH. In a case that the base station broadcasts a plurality of configuration information, the periodicity duration for discontinuously transmitting the PDCCH configured by each configuration information may be different.

In an embodiment, the base station may broadcast system information including at least one configuration information.

In step 202, it is determined to enter an energy-saving transmission mode for discontinuously transmitting the PDCCH.

In step 203, first indication information is transmitted to a terminal in a connected state. In the embodiments of the present disclosure, the first indication information is configured to activate first configuration information in the at least one configuration information.

In an embodiment, the first indication information may be DCI. The base station informs the terminal of the first configuration information in effect through the DCI.

In step 204, it is determined to activate second configuration information in the at least one configuration information. In the embodiments of the present disclosure, the second configuration information may be different from the previously activated first configuration information.

In step 205, second indication information is transmitted to the terminal in the connected state. In the embodiments of the present disclosure, the second indication information is configured to activate the second configuration information. In an embodiment, the second indication information may also be the DCI, and the second indication information includes but is not limited to paging DCI and PEI based DCI.

In an embodiment, the number of configuration information broadcasted by the base station is two, and the second indication information may include an indication bit for indicating a change in the configuration information. For example, the base station sets a bit value of the above indication bit as a preset value in the second indication information, to inform the terminal to activate the second configuration information that is different from the first configuration information. The preset value may be "1" or "0", which is not limited in the present disclosure.

In another embodiment, the number of the configuration information broadcasted by the base station is three or more than three, the second indication information may include an identifier of the second configuration information, and the terminal activates the second configuration information according to the identifier of the second configuration information in the second indication information.

In another embodiment, the second indication information may include both an indication bit for indicating a change in the configuration information and an identifier of the second configuration information. In the case that the terminal determines that the configuration information has changed based on the indication bit, the terminal activates the second configuration information based on the identifier of the second configuration information. In the above embodiment, after activating the first configuration information through the first indication information, the base station may activate the second configuration information through the second indication information, such that the terminal may discontinuously monitor the PDCCH based on the second configuration information. While achieving the purpose of saving the energy consumption of the base station, the periodicity duration for discontinuously transmitting the PDCCH may be flexibly adjusted according to the system load condition, resulting in high availability.

In some embodiments, each period for discontinuously transmitting the PDCCH includes an activation time period for transmitting the PDCCH and a sleep time period for stopping transmitting the PDCCH.

The base station may be in an active state during the activation time period and may continuously transmit the PDCCH. The base station may be in a sleep state during the sleep time period and may stop transmitting the PDCCH. In the embodiments of the present disclosure, since the power consumption of the base station is mainly caused by a transmission behavior of the base station, the base station in the sleep state may also refer to a behavior of the base station in an interval when the base station does not continuously transmit the PDCCH, which includes but is not limited to at least one of the following behaviors: receiving uplink data transmit by the terminal, receiving a request message transmitted by the terminal (such as receiving a random access request message transmitted by terminal that is not in a connected state), or receiving downlink data transmitted by a core network device and corresponding to the terminal in the connected state.

Figure 3:
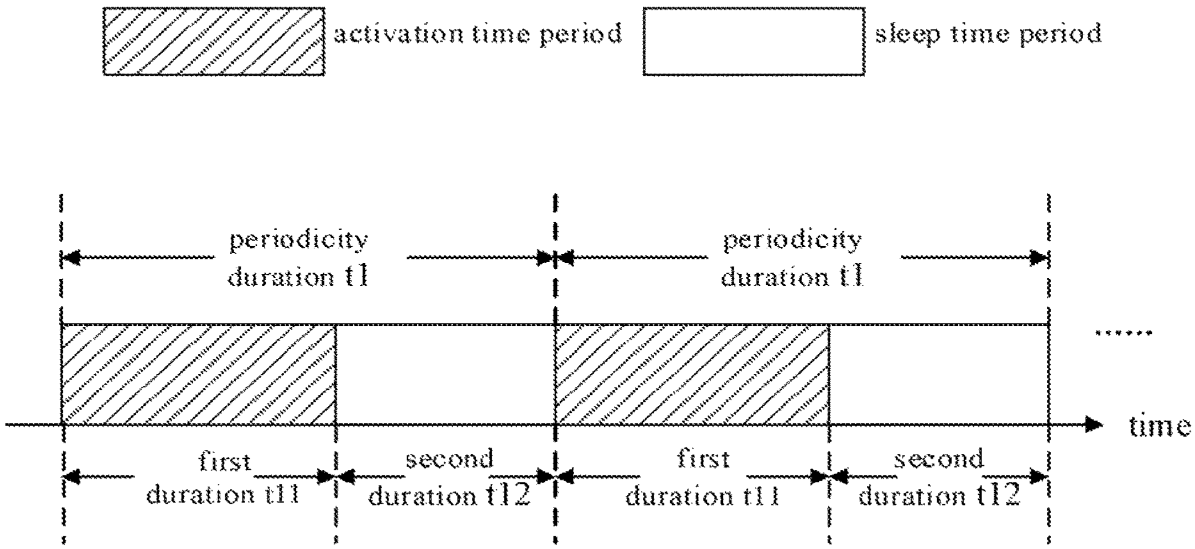
FIG. 3 is a schematic diagram of configuration information according to an embodiment.

Furthermore, the configuration information may also be configured to configure a first duration of the activation time period and a second duration of the sleep time period. For example, as shown in FIG. 3, the configuration information transmitted by the base station is configured to configure the periodicity duration t1 for discontinuously transmitting the PDCCH, with the first duration t11 for the activation time period and the second duration t12 for the sleep time period.

In the above embodiments, the configuration information may also be configured to configure the first duration of the activation time period and the second duration of the sleep time period, thereby achieving that the base state discontinuously transmits the PDCCH and saving the energy consumption of the base station.

Figure 4:
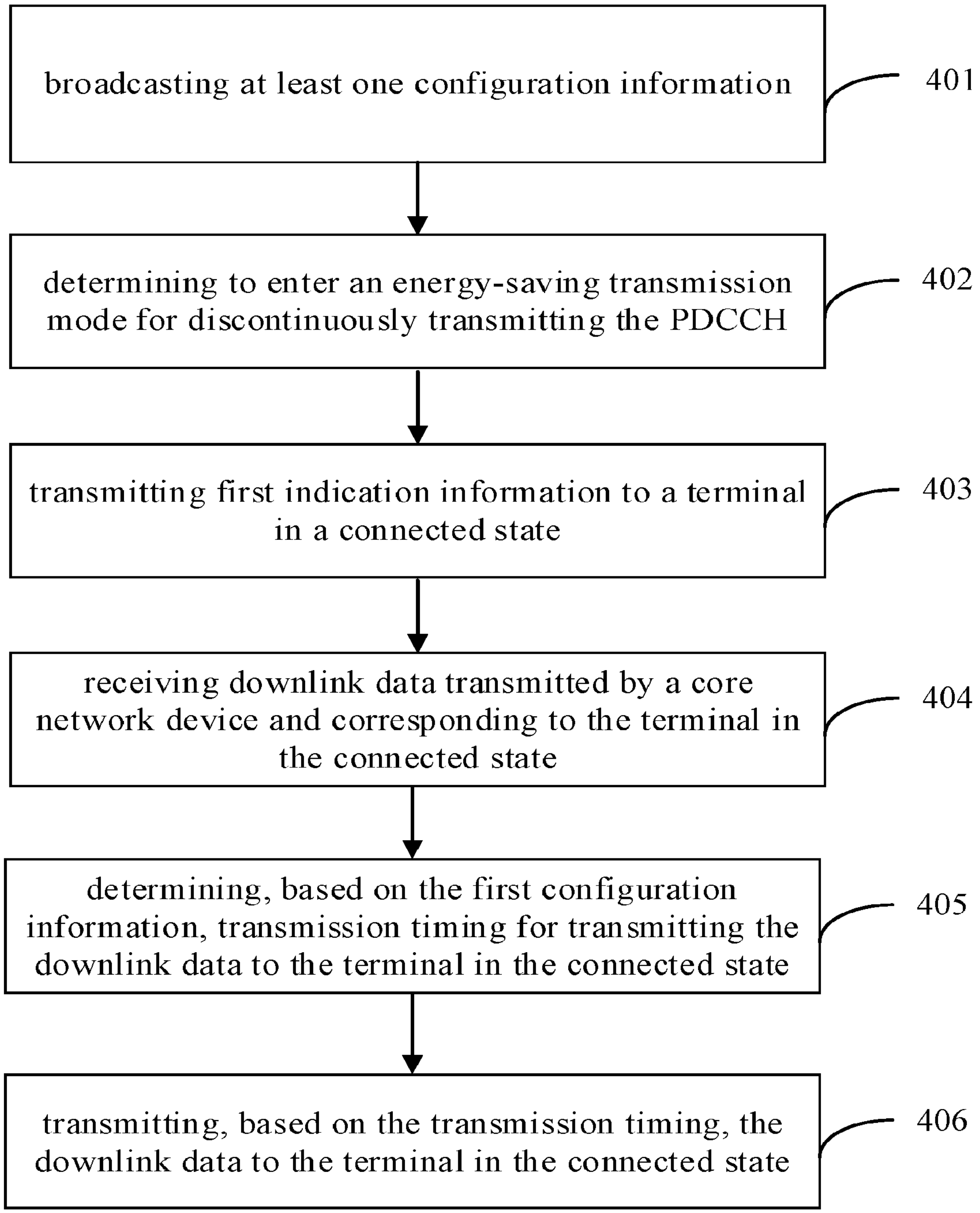
FIG. 4 is a schematic flowchart of another method for channel monitoring according to an embodiment.

In some embodiments, referring to FIG. 4, FIG. 4 is a flowchart of a method for channel monitoring according to an embodiment, which may be used for a base station, and the method may include the following steps 401 to 406:

In step 401, at least one configuration information is broadcast. In the embodiments of the present disclosure, the configuration information is configured to configure one periodicity duration for discontinuously transmitting a PDCCH. In a case that the base station broadcasts a plurality of configuration information, the periodicity duration for discontinuously transmitting the PDCCH configured by each configuration information may be different.

In an embodiment, the base station may broadcast system information including at least one configuration information.

In step 402, it is determined to enter an energy-saving transmission mode for discontinuously transmitting the PDCCH.

In step 403, first indication information is transmitted to a terminal in a connected state. In the embodiments of the present disclosure, the first indication information is configured to activate first configuration information in the at least one configuration information.

In an embodiment, the first indication information may be DCI. The base station informs the terminal of the first configuration information in effect through the DCI.

In step 404, downlink data transmitted by a core network device and corresponding to the terminal in the connected state is received.

In step 405, based on the first configuration information, it is determined transmission timing for transmitting the downlink data to the terminal in the connected state. In the embodiments of the present disclosure, the base station may determine the transmission timing based on the activated first configuration information. In an embodiment, the base station may determine that the transmission timing is within the activation time period configured by the first configuration information.

In step 406, based on the transmission timing, the downlink data is transmitted to the terminal in the connected state.

Figure 5:
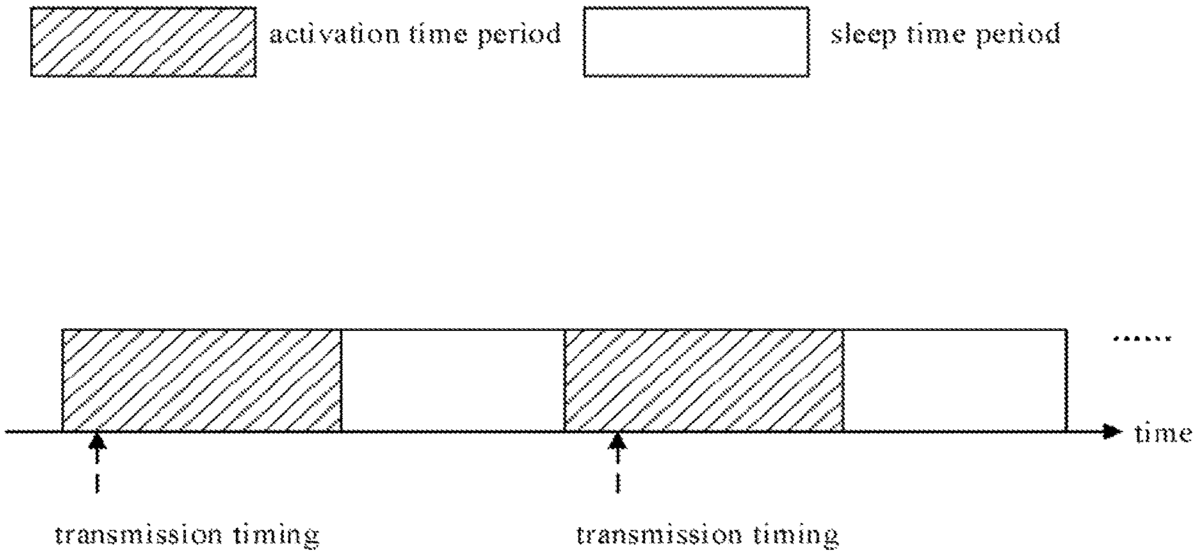
FIG. 5 is a schematic diagram of a scenario for determining transmission timing according to an embodiment.

As shown in FIG. 5, the base station may transmit the downlink data to the terminal based on the transmission timing within the activation time period.

In the above embodiments, the base station may determine the transmission timing for transmitting the downlink data to the terminal in the connected state based on the activated first configuration information, thereby achieving significant power saving effect on the base station side and saving the energy consumption of the base station.

Figure 6:
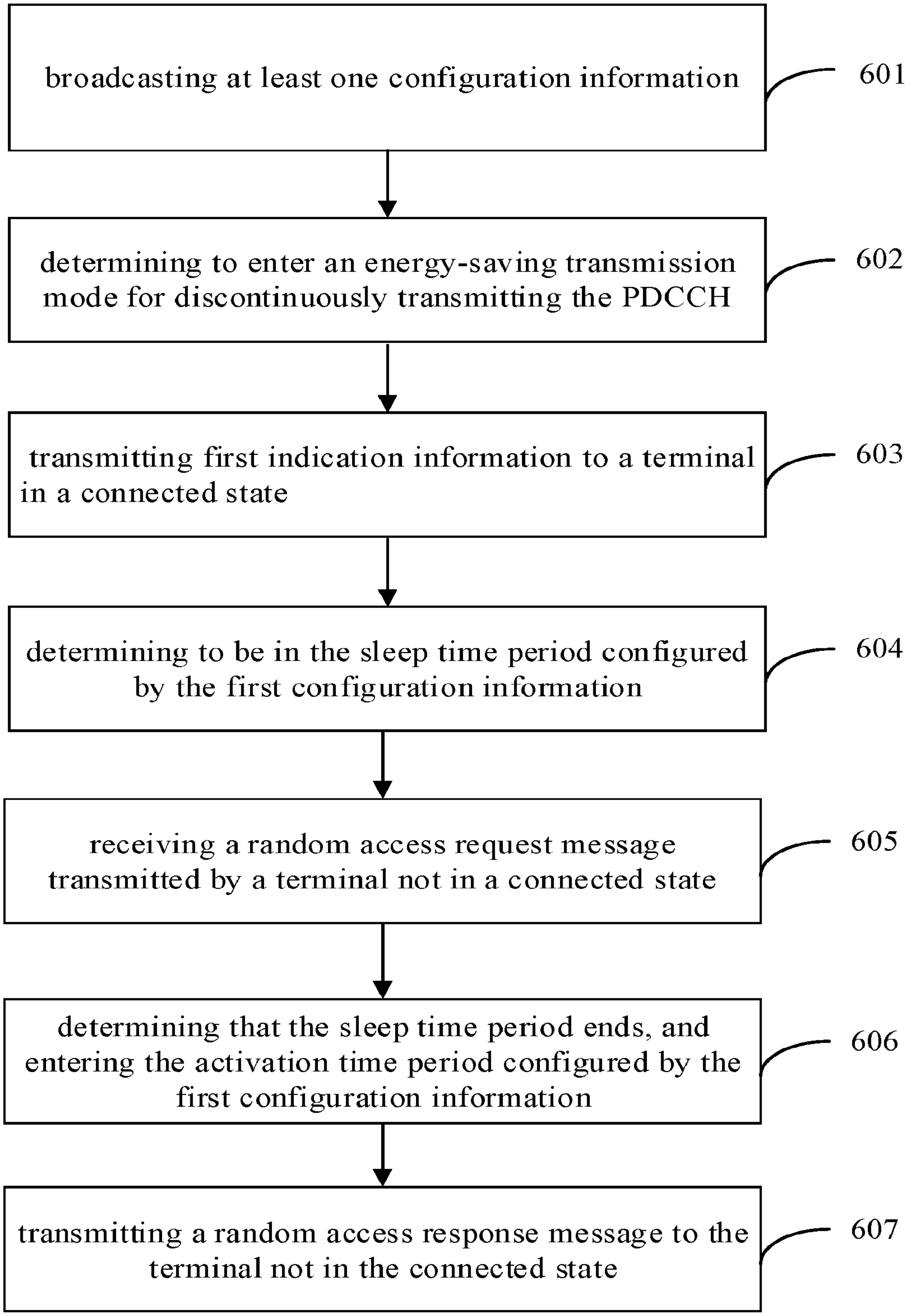
FIG. 6 is a schematic flowchart of another method for channel monitoring according to an embodiment.

In some embodiments, referring to FIG. 6, FIG. 6 is a flowchart of a method for channel monitoring according to an embodiment, which may be used for a base station, and the method may include the following steps 601 to 607:

In step 601, at least one configuration information is broadcast. In the embodiments of the present disclosure, the configuration information is configured to configure one periodicity duration for discontinuously transmitting a PDCCH. In a case that the base station broadcasts a plurality of configuration information, the periodicity duration for discontinuously transmitting the PDCCH configured by each configuration information may be different.

In an embodiment, the base station may broadcast system information including at least one configuration information.

In step 602, it is determined to enter an energy-saving transmission mode for discontinuously transmitting the PDCCH.

In step 603, first indication information is transmitted to a terminal in a connected state. In the embodiments of the present disclosure, the first indication information is configured to activate first configuration information in the at least one configuration information.

In an embodiment, the first indication information may be DCI. The base station informs the terminal of the first configuration information in effect through the DCI.

In step 604, it is determined to be in the sleep time period configured by the first configuration information.

In step 605, a random access request message transmitted by a terminal not in a connected state is received.

Figure 7A:
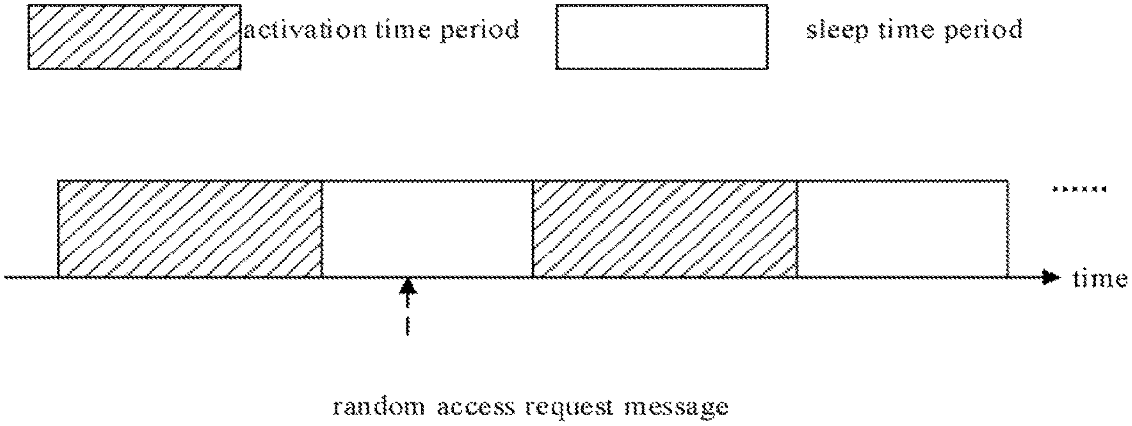
FIGS. 7A to 7B are schematic diagrams of a scenario for discontinuously transmitting a PDCCH according to an embodiment.

As shown in FIG. 7A, the base station is in the sleep time period and receives a random access request message from a terminal that is not in the connected state. The random access request message may be Msg1 (Message 1).

In step 606, it is determined that the sleep time period ends, and the activation time period configured by the first configuration information is entered.

Figure 7B:
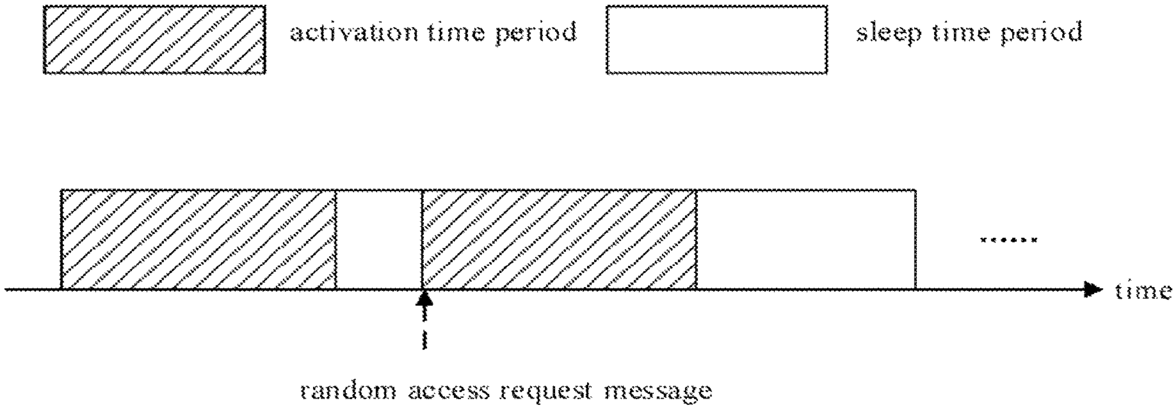

As shown in FIG. 7B, after receiving the random access request message transmitted by the terminal, the base station may enter the activation time period in advance to avoid affecting a terminal service.

In step 607, a random access response message is transmitted to the terminal not in the connected state. The random access response message may be Msg2.

In the above embodiments, when the base station receives the random access request message transmitted by the terminal that is not in the connected state during the sleep time period, the base station may enter the activation time period in advance and transmit the random access response message to the terminal that is not in the connected state, so as to avoid affecting the terminal service, resulting in the high availability.

Next, a method for channel monitoring provided in the present disclosure is introduced below from a terminal side.

Figure 8:
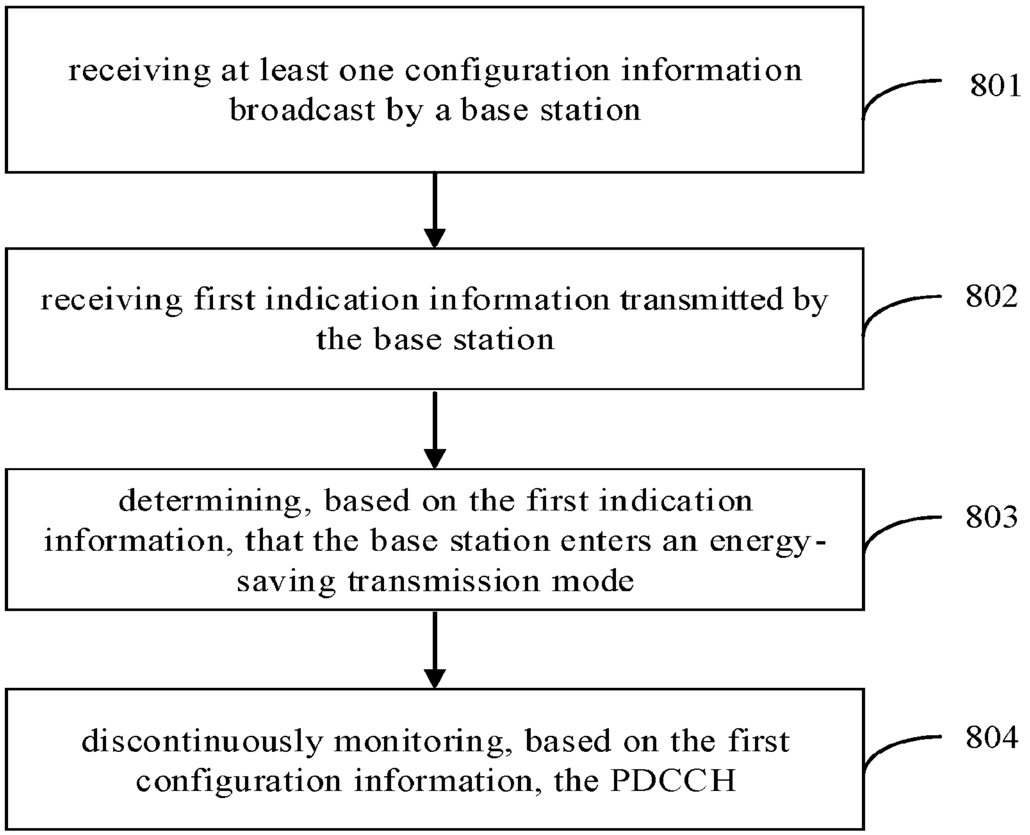
FIG. 8 is a schematic flowchart of another method for channel monitoring according to an embodiment.

Embodiments of the present disclosure provide the method for channel monitoring, as shown in FIG. 8. FIG. 8 is a flowchart of a method for channel monitoring according to an embodiment, which may be used for a terminal, including but not limited to, a mobile phone, a laptop, a desktop, an unmanned device, a large-scale smart meter or water meter, etc., and the method may include the following steps 801 to 804:

In step 801, at least one configuration information broadcast by a base station is received. In the embodiments of the present disclosure, the configuration information is configured to configure one periodicity duration for discontinuously transmitting a PDCCH. In a case that the base station broadcasts a plurality of configuration information, the periodicity duration for discontinuously transmitting the PDCCH configured by each configuration information may be different.

In step 802, first indication information transmitted by the base station is received.

In the embodiments of the present disclosure, the first indication information is configured to activate first configuration information in the at least one configuration information. The first indication information may be DCI, including but not limited to paging DCI and PEI based DCI.

In step 803, based on the first indication information, it is determined that the base station enters an energy-saving transmission mode. In the embodiments of the present disclosure, the terminal determines that the base station enters the energy-saving transmission mode for discontinuously transmitting the PDCCH based on the received first indication information.

In step 804, based on the first configuration information, the PDCCH is discontinuously monitored. In the embodiments of the present disclosure, the base station has entered the energy-saving transmission mode, and thus, the terminal does not need to continuously monitor the PDCCH and may discontinuously monitor the PDCCH based on the first configuration information.

In the above embodiments, the base station may transmit the PDCCH discontinuously, and the terminal monitors the PDCCH discontinuously based on the activated first configuration information, thereby achieving the purpose of saving the energy consumption of the base station.

Figure 9:
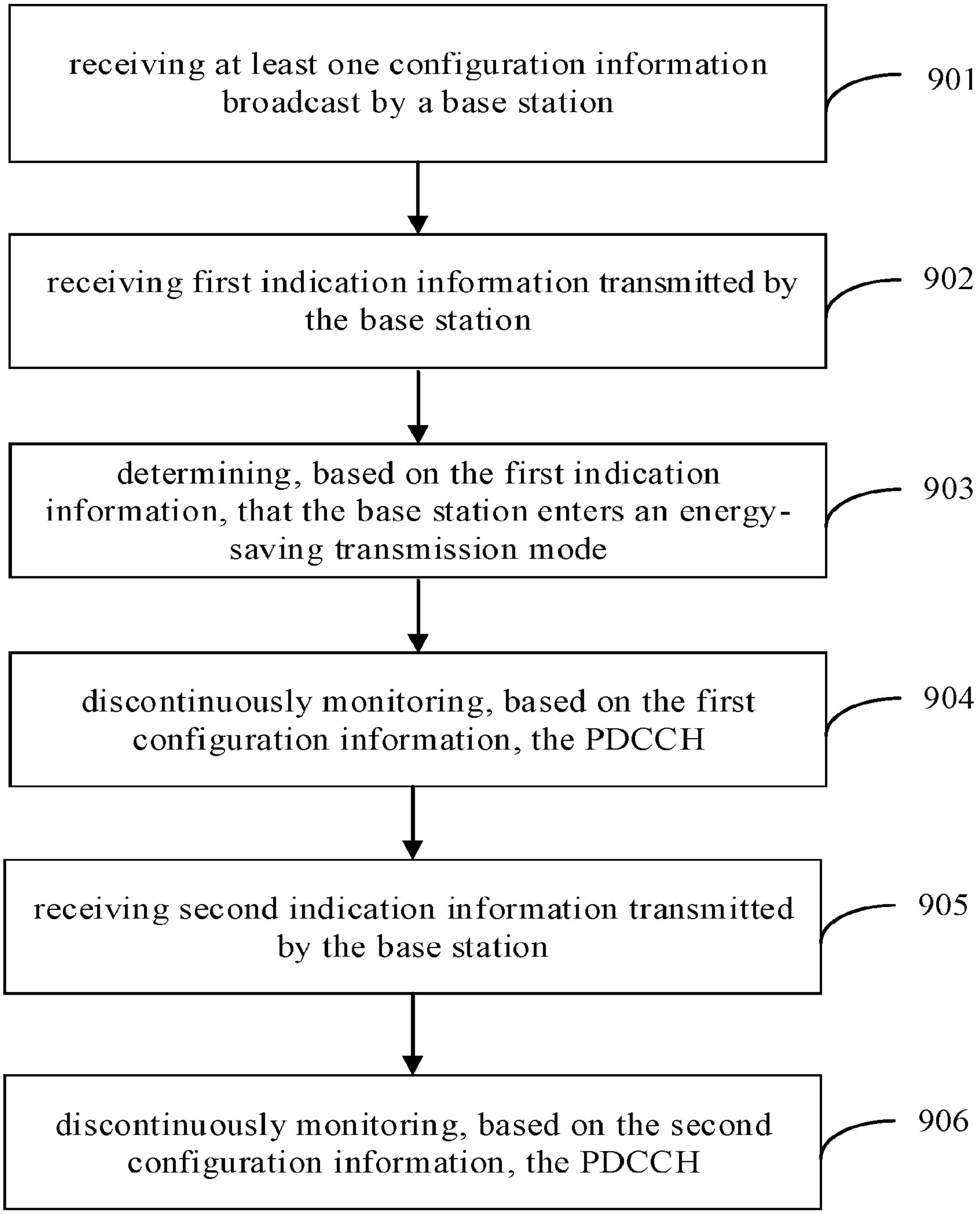
FIG. 9 is a schematic flowchart of another method for channel monitoring according to an embodiment.

In some embodiments, referring to FIG. 9, FIG. 9 is a flowchart of a method for channel monitoring according to an embodiment, which may be used for a terminal, and the method may include the following steps 901 to 906:

In step 901, at least one configuration information broadcast by a base station is received. In the embodiments of the present disclosure, the configuration information is configured to configure one periodicity duration for discontinuously transmitting a PDCCH. In a case that the base station broadcasts a plurality of configuration information, the periodicity duration for discontinuously transmitting the PDCCH configured by each configuration information may be different.

In step 902, first indication information transmitted by the base station is received. In the embodiments of the present disclosure, the first indication information is configured to activate first configuration information in the at least one configuration information. The first indication information may be DCI, including but not limited to paging DCI and PEI based DCI.

In step 903, based on the first indication information, it is determined that the base station enters an energy-saving transmission mode. In the embodiments of the present disclosure, the terminal determines that the base station enters the energy-saving transmission mode for discontinuously transmitting the PDCCH based on the received first indication information.

In step 904, based on the first configuration information, the PDCCH is discontinuously monitored. In the embodiments of the present disclosure, the terminal does not need to continuously monitor the PDCCH and may discontinuously monitor the PDCCH based on the first configuration information.

In step 905, second indication information transmitted by the base station is received. In the embodiments of the present disclosure, the second indication information may be DCI, including but not limited to paging DCI and PEI based DCI.

In an embodiment, the second indication information includes an indication bit for indicating a change in the configuration information. In another embodiment, the second indication information includes an identifier of the second configuration information. In another embodiment, the second indication information includes both an indication bit for indicating a change in the configuration information and an identifier of the second configuration information.

In step 906, based on the second configuration information, the PDCCH is discontinuously monitored. In the embodiments of the present disclosure, the terminal may determine the activated second configuration information based on the second indication information, thereby discontinuously monitoring the PDCCH based on the second configuration information.

In the above embodiments, the terminal may activate the second configuration information based on the second indication information transmitted by the base station, thereby changing the periodicity duration for discontinuously monitoring the PDCCH, which is easy to implement and has the high availability.

In some embodiments, each period for discontinuously transmitting the PDCCH includes an activation time period for transmitting the PDCCH and a sleep time period for stopping transmitting the PDCCH.

Figure 10:
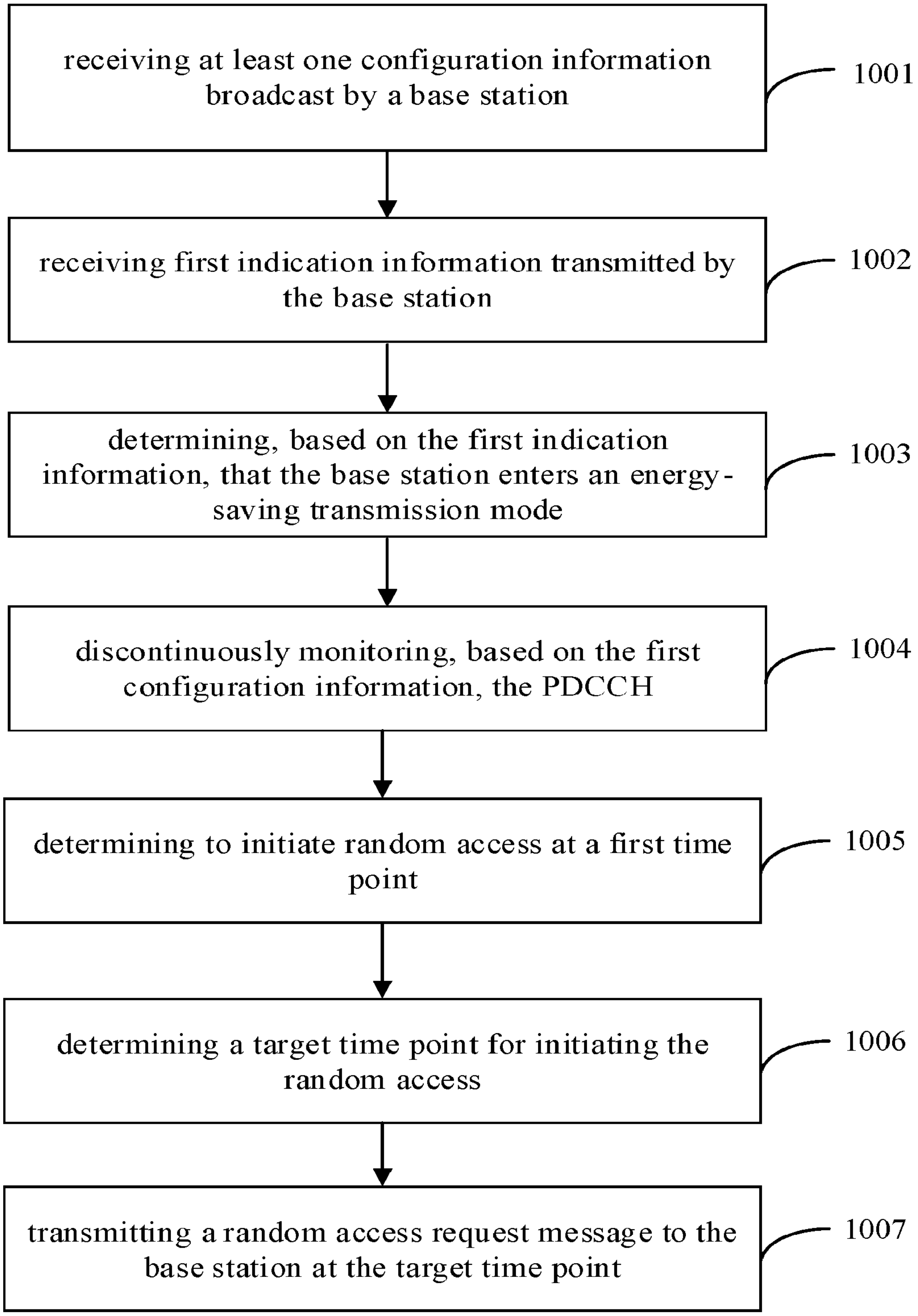
FIG. 10 is a schematic flowchart of another method for channel monitoring according to an embodiment.

The configuration information may also be configured to configure a first duration of the activation time period and a second duration of the sleep time period. In some embodiments, referring to FIG. 10, FIG. 10 is a flowchart of a method for channel monitoring according to an embodiment, which may be used for a terminal, and the method may include the following steps 1001 to 1007:

In step 1001, at least one configuration information broadcast by a base station is received.

In the embodiments of the present disclosure, the configuration information is configured to configure one periodicity duration for discontinuously transmitting a PDCCH. In a case that the base station broadcasts a plurality of configuration information, the periodicity duration for discontinuously transmitting the PDCCH configured by each configuration information may be different.

In step 1002, first indication information transmitted by the base station is received.

In the embodiments of the present disclosure, the first indication information is configured to activate first configuration information in the at least one configuration information. The first indication information may be DCI, including but not limited to paging DCI or PEI based DCI.

In step 1003, based on the first indication information, it is determined that the base station enters an energy-saving transmission mode.

In step 1004, based on the first configuration information, the PDCCH is discontinuously monitored.

In step 1005, it is determined to initiate random access at a first time point.

In the embodiments of the present disclosure, the first time point is within the sleep time period configured by the first configuration information.

In an embodiment, the terminal determines to communicate under a cellular network and, in a case of establishing an RRC (Radio Resource Control) connection with the base station at the first time point, it is determined to initiate the random access at the first time point.

In another embodiment, the terminal determines to switch from a WLAN (Wireless Local Area Network) to a cellular network for communication at the first time point, and then determine to initiate the random access at the first time point.

In step 1006, it is determined a target time point for initiating the random access.

In an embodiment, the terminal belongs to a URLLC (Ultra-reliable and Low Latency Communications) terminal, and accordingly, the terminal service is a low latency service. To avoid affecting the terminal service, it may be determined that the URLLC terminal belongs to a terminal that may initiate the random access request at any time.

Figure 11A:
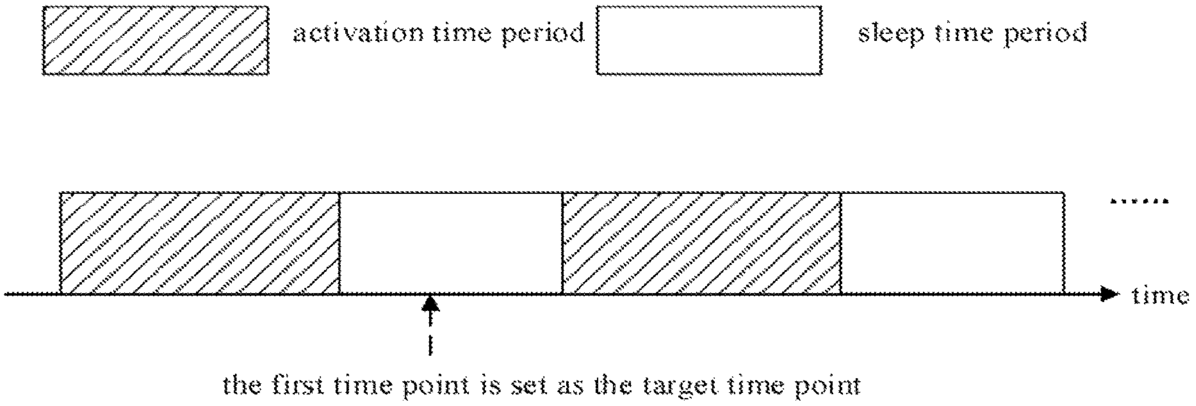
FIGS. 11A to 11B are schematic diagrams of a scenario for determining a target time point according to an embodiment.

In the embodiments of the present disclosure, even if the first time point at which the URLLC terminal initiates the random access is within the sleep time period when the base station discontinuously transmits the PDCCH, the terminal may still use the first time point as the target time point for initiating the random access, as shown in FIG. 11A.

In another embodiment, the terminal belongs to a type of terminal other than the URLLC terminal, and accordingly, a terminal service does not belong to a low latency service. It may be determined that the terminal belongs to a terminal that cannot initiate the random access at any time.

Figure 11B:
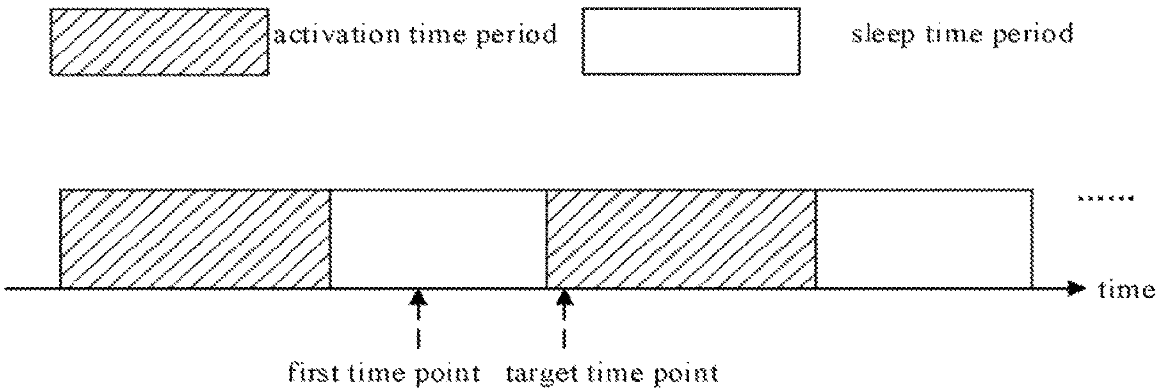

In the embodiments of the present disclosure, the first time point at which the terminal initiates the random access is within the sleep time period when the base station discontinuously transmits the PDCCH. Thus, the terminal may determine a certain time point as the target time point for initiating the random access during the activation time period when the base station discontinuously transmits the PDCCH, as shown in FIG. 11B.

In step 1007, a random access request message is transmitted to the base station at the target time point.

In the above embodiments, both the case in which the terminal communicates under the cellular network and the case in which the terminal switches between the WLAN and the cellular network are considered, and the terminal may initiate the random access at any time based on its own service type, or initiate the random access request during the activation time period. While saving the energy consumption of the base station, it avoids affecting the terminal service and has the high availability.

Figure 12:
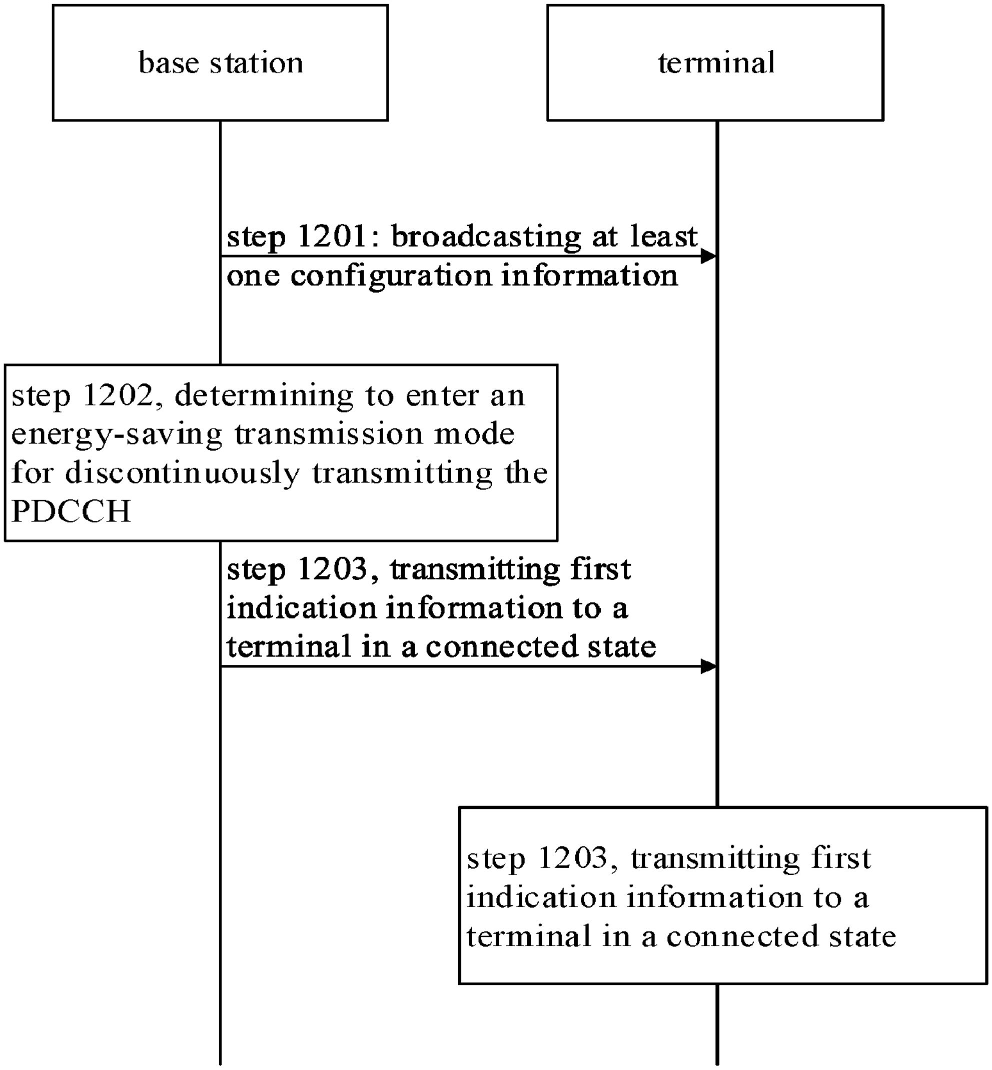
FIG. 12 is a schematic flowchart of another method for channel monitoring according to an embodiment.

In some embodiments, referring to FIG. 12, FIG. 12 is a flowchart of a method for channel monitoring according to an embodiment, and the method may include the following steps 1201 to 1204:

In step 1201, the base station broadcasts at least one configuration information. In the embodiments of the present disclosure, the configuration information is configured to configure one periodicity duration for discontinuously transmitting a physical downlink control channel PDCCH.

In step 1202, the base station determines to enter an energy-saving transmission mode for discontinuously transmitting the PDCCH.

In step 1203, the base station transmits first indication information to a terminal in a connected state. In the embodiments of the present disclosure, the first indication information is configured to activate first configuration information in the at least one configuration information.

In step 1204, the terminal discontinuously monitors the PDCCH based on the first configuration information. In the above embodiment, the base station may transmit the PDCCH discontinuously, and the terminal may monitor the PDCCH discontinuously based on the first configuration information, so as to save the energy consumption of the base station.

Figure 13:
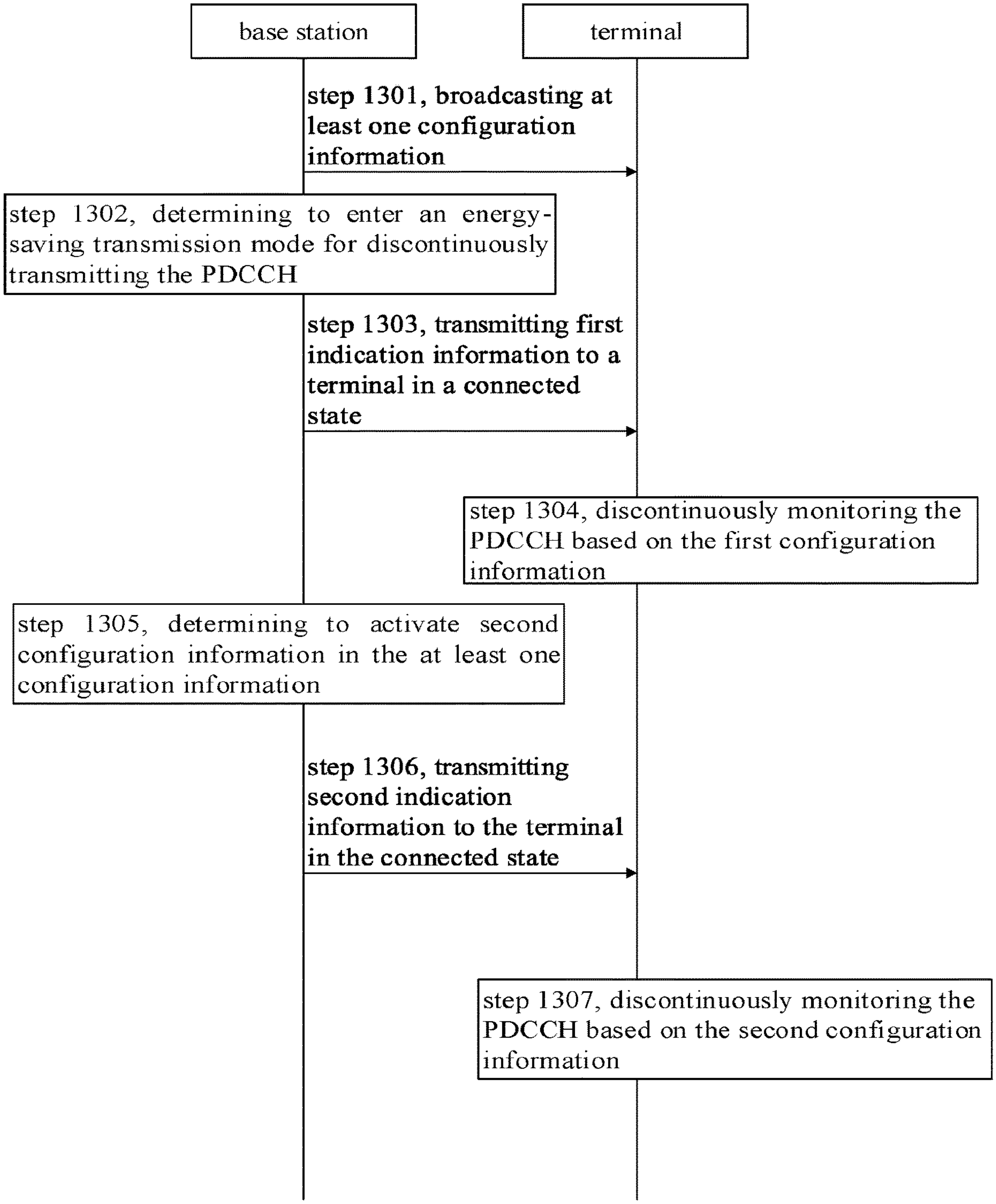
FIG. 13 is a schematic flowchart of another method for channel monitoring according to an embodiment.

In some embodiments, referring to FIG. 13, FIG. 13 is a flowchart of a method for channel monitoring according to an embodiment, and the method may include the following steps 1301 to 1307:

In step 1301, the base station broadcasts at least one configuration information. In the embodiments of the present disclosure, the configuration information is configured to configure one periodicity duration for discontinuously transmitting a physical downlink control channel PDCCH.

In step 1302, the base station determines to enter an energy-saving transmission mode for discontinuously transmitting the PDCCH.

In step 1303, the base station transmits first indication information to a terminal in a connected state.

In the embodiments of the present disclosure, the first indication information is configured to activate first configuration information in the at least one configuration information.

In step 1304, the terminal discontinuously monitors the PDCCH based on the first configuration information.

In step 1305, the base station determines to activate second configuration information in the at least one configuration information.

In step 1306, the base station transmits second indication information to the terminal in the connected state. In the embodiments of the present disclosure, the second indication information is configured to activate the second configuration information.

In step 1307, the terminal discontinuously monitors the PDCCH based on the second configuration information. In the above embodiment, the base station may activate the first configuration information through the first indication information. In the case that the configuration information changes, the second configuration information may be activated through the second indication information, such that the terminal may discontinuously monitor the PDCCH based on the second configuration information. While achieving the purpose of saving the energy consumption of the base station, the periodicity duration for discontinuously transmitting the PDCCH may be flexibly adjusted according to the system load condition, resulting in high availability.

Figure 14:
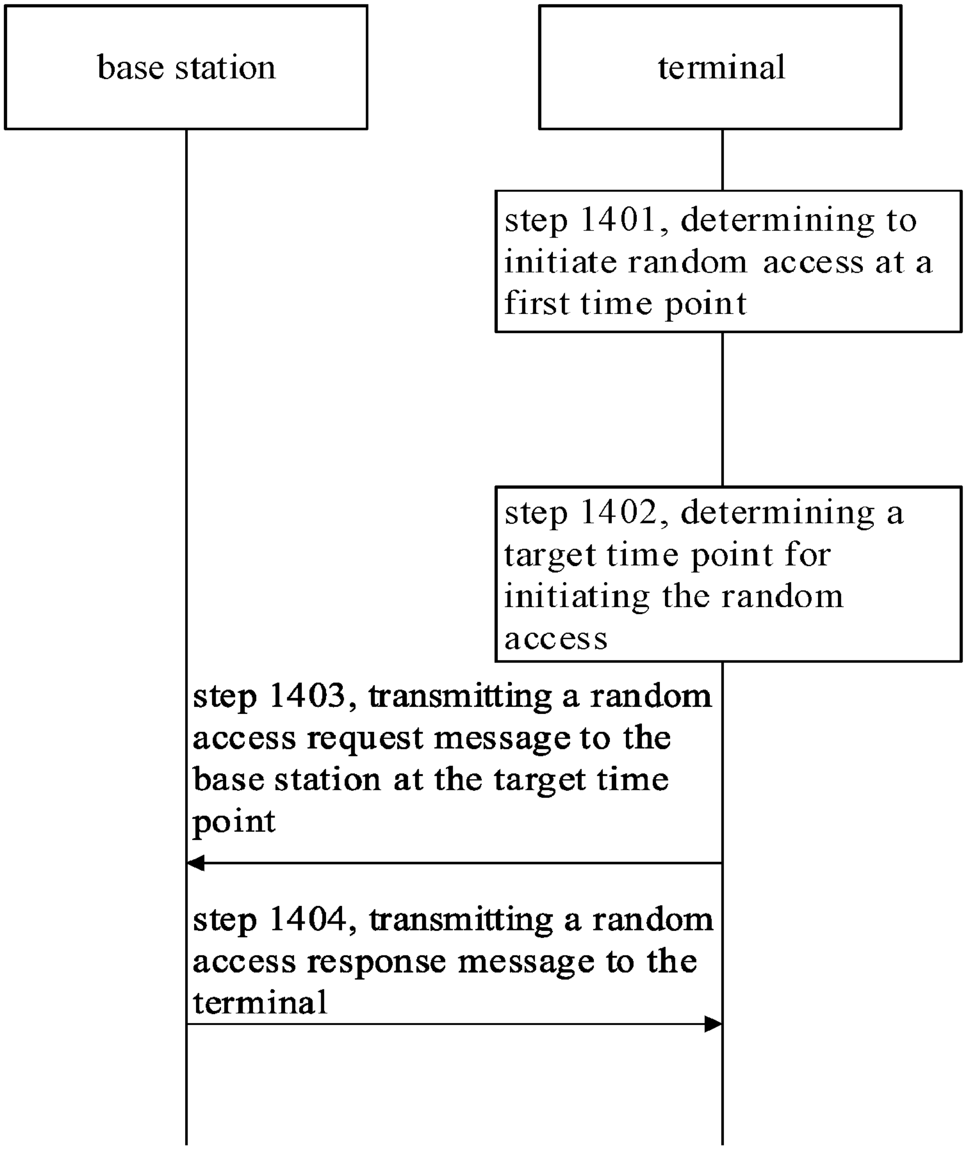
FIG. 14 is a schematic flowchart of another method for channel monitoring according to an embodiment.

In some embodiments, referring to FIG. 14, FIG. 14 is a flowchart of a method for channel monitoring according to an embodiment, and the method may include the following steps 1401 to 1404:

In step 1401, the terminal determines to initiate random access at a first time point. The first time point is within the sleep time period configured by the first configuration information that is activated by the base station.

In step 1402, the terminal determines a target time point for initiating the random access. The terminal may set the first time point as the target time point in the case that the terminal service belongs to a low latency service. In an embodiment, in the case that the terminal service does not belong to a low latency service, the terminal determines the target time point to be within the activation time period configured by the first configuration information.

In step 1403, the terminal transmits a random access request message to the base station at the target time point.

In step 1404, the base station transmits a random access response message to the terminal. In the embodiments of the present disclosure, if the base station is within the activation time period configured by the first configuration information, the base station may directly transmit the random access response message to the terminal. If the base station is in the sleep time period configured by the first configuration information, the base station may enter the activation time period in advance and transmit the random access response message to the terminal. In the above embodiments, the terminal may determine the target time point for initiating the random access according to the terminal service, which saves the energy consumption of the base station while avoiding affecting the terminal service, and the availability is high.

Corresponding to the method embodiments, the present disclosure further provides apparatus embodiments and apparatus embodiments for achieving corresponding application functions.

Figure 15:
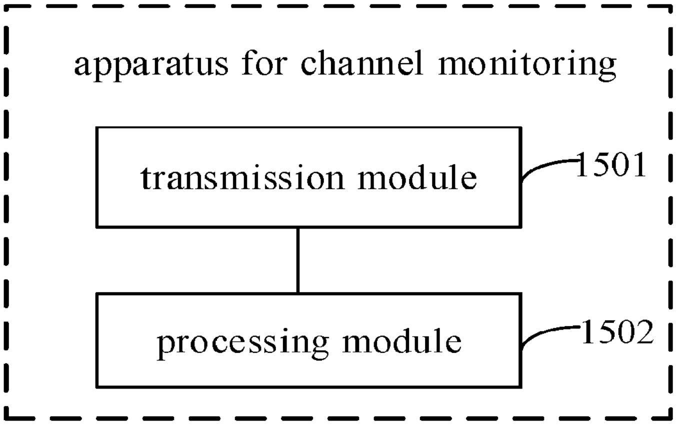
FIG. 15 is a block diagram of an apparatus for channel monitoring according to an embodiment.

Referring to FIG. 15, FIG. 15 is a block diagram of an apparatus for channel monitoring according to an embodiment, and the apparatus includes a transmission module 1501, configured to broadcast at least one configuration information, where the configuration information is configured to configure one periodicity duration for discontinuously transmitting a physical downlink control channel PDCCH, a processing module 1502, configured to determine to enter an energy-saving transmission mode for discontinuously transmitting the PDCCH, and the transmission module 1501 is further configured to transmit first indication information to a terminal in a connected state, where the first indication information is configured to activate first configuration information in the at least one configuration information.

In some embodiments, the processing module is further configured to determine to activate second configuration information in the at least one configuration information; and

- the transmission module is further configured to transmit second indication information to the terminal in the connected state, where the second indication information is configured to activate the second configuration information. In some embodiments, each period for discontinuously transmitting the PDCCH includes an activation time period for transmitting the PDCCH and a sleep time period for stopping transmitting the PDCCH; and the configuration information is further configured to configure a first duration of the activation time period and a second duration of the sleep time period. In some embodiments, the apparatus further includes a receiving module, configured to receive downlink data transmitted by a core network device and corresponding to the terminal in the connected state, the processing module is further configured to determine, based on the first configuration information, transmission timing for transmitting the downlink data to the terminal in the connected state, and the transmission module is further configured to transmit, based on the transmission timing, the downlink data to the terminal in the connected state.

In some embodiments, the processing module is further configured to determine the transmission timing to be within the activation time period configured by the first configuration information. In some embodiments, the processing module is further configured to determine to be in the sleep time period configured by the first configuration information. The apparatus further includes a receiving module, configured to receive a random access request message transmitted by a terminal not in a connected state;

- where the processing module is further configured to determine that the sleep time period ends, and enter the activation time period configured by the first configuration information, and the transmission module is further configured to transmit a random access response message to the terminal not in the connected state.

Figure 16:
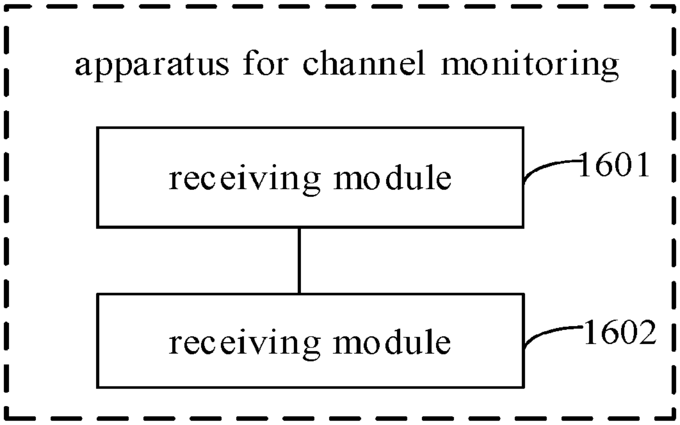
FIG. 16 is a block diagram of another apparatus for channel monitoring according to an embodiment.

Referring to FIG. 16, FIG. 16 is a block diagram of an apparatus for channel monitoring according to an embodiment, and the apparatus includes a receiving module 1601, configured to receive at least one configuration information broadcast by a base station, where the configuration information is configured to configure one periodicity duration for discontinuously transmitting a physical downlink control channel PDCCH. The receiving module 1601 is further configured to receive first indication information transmitted by the base station, where the first indication information is configured to activate first configuration information in the at least one configuration information, a processing module 1602, configured to determine, based on the first indication information, that the base station enters an energy-saving transmission mode, and the receiving module 1601 is further configured to discontinuously monitor, based on the first configuration information, the PDCCH.

In some embodiments, the receiving module is further configured to receive second indication information transmitted by the base station, where the second indication information is configured to activate second configuration information, and discontinuously monitor, based on the second configuration information, the PDCCH.

In some embodiments, each period for discontinuously transmitting the PDCCH includes an activation time period for transmitting the PDCCH and a sleep time period for stopping transmitting the PDCCH, and the configuration information is further configured to configure a first duration of the activation time period and a second duration of the sleep time period.

In some embodiments, the processing module is further configured to determine to initiate random access at a first time point, where the first time point is within the sleep time period configured by the first configuration information, and determine a target time point for initiating the random access. The apparatus further includes a transmission module, configured to transmit a random access request message to the base station at the target time point.

In some embodiments, the processing module is further configured to determine that a terminal service is a low latency service, and determine that the first time point is the target time point.

In some embodiments, the processing module is further configured to determine that a terminal service does not belong to a low latency service, and determine the target time point within the activation time period configured by the first configuration information.

In some embodiments, the processing module is further configured to determine to perform communication under a cellular network and establish a RRC connection with the base station at the first time point, and determine to initiate the random access at the first time point.

In some embodiments, the processing module is further configured to determine to switch from a wireless local area network to a cellular network for communication at the first time point, and determine to initiate the random access at the first time point.

For the apparatus embodiment, since the apparatus substantially corresponds to the method embodiment, reference may be made to some description of the method embodiment. The apparatus embodiments described above are merely schematic, in which the units described as separate components may or may not be physically separated, and the components displayed as units may or may not be physical units, may be located in one place, or may be distributed to a plurality of network units. Some or all of the modules may be selected according to actual needs to achieve the solution of the present disclosure, which a person of ordinary skill in the art would understand and implement without creative efforts.

Correspondingly, the present disclosure provides a non-transitory computer readable storage medium, having a computer program stored thereon, where the computer program is configured to implement any of the methods for channel monitoring applied to the base station side as described above.

Correspondingly, the present disclosure provides a non-transitory computer readable storage medium, having a computer program stored thereon, where the computer program is configured to implement any of the methods for channel monitoring applied to the terminal side as described above.

Correspondingly, the present disclosure provides a communication apparatus, including a processor and a memory for storing instructions executable by the processor. The processor is configured to perform any of the above methods for channel monitoring applied to the base station side.

Figure 17:
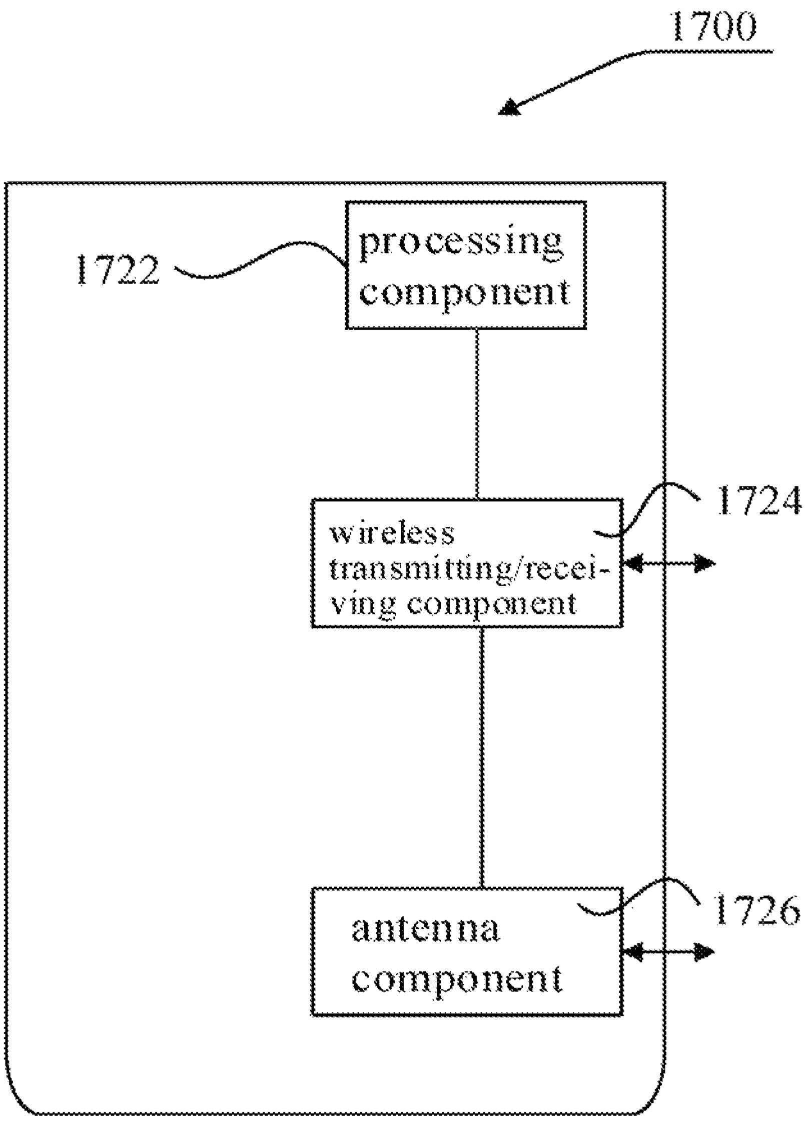
FIG. 17 is a schematic structural diagram of a communication apparatus according to an embodiment of the present disclosure.

As shown in FIG. 17, FIG. 17 is a schematic structural diagram of a communication apparatus 1700 according to an embodiment of the present disclosure. The apparatus 1700 may be provided as a base station. Referring to FIG. 17, the apparatus 1700 includes a processing component 1722, a wireless transmitting/receiving component 1724, an antenna component 1726, and a signal processing part specific to a wireless interface. The processing component 1722 may further include one or more processors.

A processor of the processing component 1722 may be configured to implement any of the above methods for channel monitoring applied to the base station side.

Correspondingly, the present disclosure provides a communication apparatus, including a processor and a memory for storing instructions executable by the processor. The processor is configured to perform any of the above methods for channel monitoring applied to the terminal side.

Figure 18:
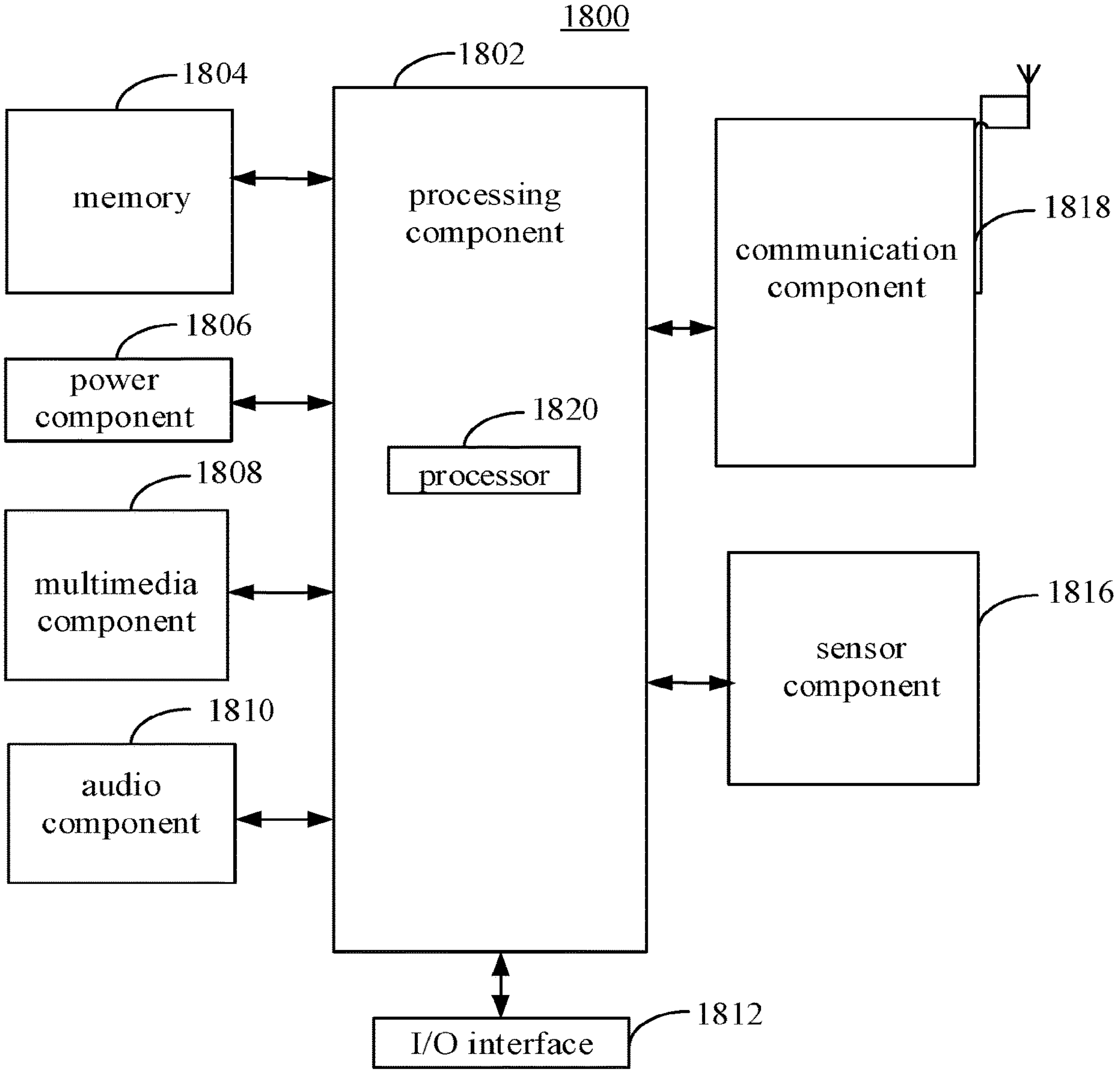
FIG. 18 is a schematic structural diagram of another communication apparatus according to an embodiment of the present disclosure.

FIG. 18 is a block diagram showing a communication apparatus 1800 according to an embodiment of the present disclosure. For example, the communication apparatus 1800 may be a terminal such as a mobile phone, a tablet computer, an e-book reader, a multimedia playing device, a wearable device, a vehicle-mounted user equipment, an iPad, a smart television and an unmanned device, etc.

Referring to FIG. 18, the communication apparatus 1800 may include one or more of the following components: a processing component 1802, a memory 1804, a power component 1806, a multimedia component 1808, an audio component 1810, an input/output (I/O) interface 1812, a sensor component 1816, and a communication component 1818.

The processing component 1802 typically controls overall operations of the communication apparatus 1800, such as the operations associated with display, phone calls, data random accesses, camera operations, and recording operations. The processing component 1802 may include one or more processors 1820 to execute instructions to perform all or some of the steps in the above-described methods for channel monitoring. Moreover, the processing component 1802 may include one or more modules which facilitate the interaction between the processing component 1802 and other components. For instance, the processing component 1802 may include a multimedia module to facilitate the interaction between the multimedia component 1808 and the processing component 1802. For another example, the processing component 1802 may read executable instructions from the memory to implement steps in the method for channel monitoring provided in the various embodiments described above.

The memory 1804 is configured to store various types of data to support the operation of the communication apparatus 1800. Examples of such data include instructions for any applications or methods operated on the communication apparatus 1800, contact data, phonebook data, messages, pictures, videos, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the communication apparatus 1800. The power component 1806 may include a power management system, one or more power sources, and any other components associated with the generation, management, and distribution of power in the communication apparatus 1800.

The multimedia component 1808 includes a screen providing an output interface between the communication apparatus 1800 and the user. In some embodiments, the multimedia component 1808 includes a front camera and/or a rear camera. The front camera and/or the rear camera may receive an external multimedia datum while the communication apparatus 1800 is in an operation mode, such as a photographing mode or a video mode. Each of the front camera and the rear camera may be a fixed optical lens system or have focus and optical zoom capability.

The audio component 1810 is configured to output and/or input audio signals. For example, the audio component 1810 includes a microphone (MIC) configured to receive an external audio signal when the communication apparatus 1800 is in an operation mode, such as a call mode, a recording mode, and a voice recognition mode. The received audio signal may be further stored in the memory 1804 or transmitted via the communication component 1818. In some embodiments, the audio component 1810 further includes a speaker to output audio signals.

The I/O interface 1812 provides an interface between the processing component 1802 and peripheral interface modules, such as keyboards, click wheels, buttons, and the like. The buttons may include, but are not limited to, a home button, a volume button, a starting button, and a locking button.

The sensor component 1816 includes one or more sensors to provide status assessments of various aspects of the communication apparatus 1800. For instance, the sensor component 1816 may detect an open/closed status of the communication apparatus 1800, relative positioning of components, e.g., the display and the keypad, of the communication apparatus 1800, a change in position of the communication apparatus 1800 or a component of the communication apparatus 1800, a presence or absence of user contact with the communication apparatus 1800, an orientation or an acceleration/deceleration of the communication apparatus 1800, and a change in temperature of the communication apparatus 1800. The sensor component 1816 may include a proximity sensor configured to detect the presence of nearby objects without any physical contact. The sensor component 1816 may further include a light sensor, such as a CMOS or CCD image sensor, for use in imaging applications. In some embodiments, the sensor component 1816 may further include an accelerometer sensor, a gyroscope sensor, a magnetic sensor, a pressure sensor, or a temperature sensor.

The communication component 1818 is configured to facilitate wired or wireless communication between the communication apparatus 1800 and other devices. The communication apparatus 1800 may access a wireless network based on a communication standard, such as Wi-Fi, 2G, 3G, 4G, 5G, 6G or a combination thereof. In an embodiment, the communication component 1818 receives a broadcast signal or broadcast associated information from an external broadcast management system via a broadcast channel. In an embodiment, the communication component 1818 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the communication apparatus 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing any of the methods for channel monitoring applied to the terminal side.

In an embodiment, there is also provided a non-transitory machine readable storage medium including instructions, such as included in the memory 1804, executable by the processor 1820 in the communication apparatus 1800, for completing the above-mentioned method for channel monitoring. For example, the non-transitory computer-readable storage medium may be a ROM, a random access memory (RAM), a CD-ROM, a magnetic tape, a floppy disc, an optical data storage device, and the like.

According to a first aspect of embodiments of the present disclosure, a method for channel monitoring is provided, the method is performed by a base station and includes:

broadcasting at least one configuration information, where the configuration information is configured to configure one periodicity duration for discontinuously transmitting a physical downlink control channel PDCCH, determining to enter an energy-saving transmission mode for discontinuously transmitting the PDCCH, and transmitting first indication information to a terminal in a connected state, where the first indication information is configured to activate first configuration information in the at least one configuration information.

In some embodiments, the method further includes determining to activate second configuration information in the at least one configuration information, and transmitting second indication information to the terminal in the connected state, where the second indication information is configured to activate the second configuration information.

In some embodiments, each period for discontinuously transmitting the PDCCH includes an activation time period for transmitting the PDCCH and a sleep time period for stopping transmitting the PDCCH; and the configuration information is further configured to configure a first duration of the activation time period and a second duration of the sleep time period.

In some embodiments, after transmitting the first indication information to the terminal in the connected state, the method further includes receiving downlink data transmitted by a core network device and corresponding to the terminal in the connected state, determining, based on the first configuration information, transmission timing for transmitting the downlink data to the terminal in the connected state, and transmitting, based on the transmission timing, the downlink data to the terminal in the connected state.

In some embodiments, where determining, based on the first configuration information, the transmission timing for transmitting the downlink data to the terminal in the connected state includes:

determining the transmission timing to be within the activation time period configured by the first configuration information.

In some embodiments, the method further includes:

determining to be in the sleep time period configured by the first configuration information;

receiving a random access request message transmitted by a terminal not in a connected state;

determining that the sleep time period ends, and entering the activation time period configured by the first configuration information; and transmitting a random access response message to the terminal not in the connected state.

According to a second aspect of embodiments of the present disclosure, a method for channel monitoring, the method is performed by a terminal and includes:

receiving at least one configuration information broadcast by a base station, where the configuration information is configured to configure one periodicity duration for discontinuously transmitting a physical downlink control channel PDCCH;

receiving first indication information transmitted by the base station, where the first indication information is configured to activate first configuration information in the at least one configuration information;

determining, based on the first indication information, that the base station enters an energy-saving transmission mode; and discontinuously monitoring, based on the first configuration information, the PDCCH.

In some embodiments, the method further includes:

receiving second indication information transmitted by the base station, where the second indication information is configured to activate second configuration information; and discontinuously monitoring, based on the second configuration information, the PDCCH.

In some embodiments, each period for discontinuously transmitting the PDCCH includes an activation time period for transmitting the PDCCH and a sleep time period for stopping transmitting the PDCCH; and the configuration information is further configured to configure a first duration of the activation time period and a second duration of the sleep time period.

In some embodiments, the method further includes:

determining to initiate random access at a first time point, where the first time point is within the sleep time period configured by the first configuration information;

determining a target time point for initiating the random access; and transmitting a random access request message to the base station at the target time point.

In some embodiments, where determining the target time point for initiating the random access includes:

determining that a terminal service is a low latency service; and determining that the first time point is the target time point.

In some embodiments, where determining the target time point for initiating the random access includes:

determining that a terminal service does not belong to a low latency service; and determining the target time point within the activation time period configured by the first configuration information.

In some embodiments, where determining to initiate the random access at the first time point includes:

determining to perform communication under a cellular network and establishing a RRC connection with the base station at the first time point; and determining to initiate the random access at the first time point.

In some embodiments, where determining to initiate the random access at the first time point includes:

determining to switch from a wireless local area network to a cellular network for communication at the first time point; and determining to initiate the random access at the first time point.

According to a third aspect of embodiments of the present disclosure, an apparatus for channel monitoring is provided and includes:

a transmission module, configured to broadcast at least one configuration information, where the configuration information is configured to configure one periodicity duration for discontinuously transmitting a physical downlink control channel PDCCH;

a processing module, configured to determine to enter an energy-saving transmission mode for discontinuously transmitting the PDCCH; and where the transmission module is further configured to transmit first indication information to a terminal in a connected state, where the first indication information is configured to activate first configuration information in the at least one configuration information.

In some embodiments, the processing module is further configured to determine to activate second configuration information in the at least one configuration information; and the transmission module is further configured to transmit second indication information to the terminal in the connected state, where the second indication information is configured to activate the second configuration information.

In some embodiments, each period for discontinuously transmitting the PDCCH includes an activation time period for transmitting the PDCCH and a sleep time period for stopping transmitting the PDCCH; and the configuration information is further configured to configure a first duration of the activation time period and a second duration of the sleep time period.

In some embodiments, the apparatus further includes:

a receiving module, configured to receive downlink data transmitted by a core network device and corresponding to the terminal in the connected state;

where the processing module is further configured to determine, based on the first configuration information, transmission timing for transmitting the downlink data to the terminal in the connected state; and the transmission module is further configured to transmit, based on the transmission timing, the downlink data to the terminal in the connected state.

In some embodiments, the processing module is further configured to determine the transmission timing to be within the activation time period configured by the first configuration information.

In some embodiments, the processing module is further configured to determine to be in the sleep time period configured by the first configuration information;

the apparatus further includes:

a receiving module, configured to receive a random access request message transmitted by a terminal not in a connected state;

where the processing module is further configured to determine that the sleep time period ends, and enter the activation time period configured by the first configuration information; and the transmission module is further configured to transmit a random access response message to the terminal not in the connected state.

According to a fourth aspect of embodiments of the present disclosure, an apparatus for channel monitoring is provided and includes:

a receiving module, configured to receive at least one configuration information broadcast by a base station, where the configuration information is configured to configure one periodicity duration for discontinuously transmitting a physical downlink control channel PDCCH;

where the receiving module is further configured to receive first indication information transmitted by the base station, where the first indication information is configured to activate first configuration information in the at least one configuration information;

a processing module, configured to determine, based on the first indication information, that the base station enters an energy-saving transmission mode; and where the receiving module is further configured to discontinuously monitor, based on the first configuration information, the PDCCH.

In some embodiments, the receiving module is further configured to:

receive second indication information transmitted by the base station, where the second indication information is configured to activate second configuration information; and discontinuously monitor, based on the second configuration information, the PDCCH.

In some embodiments, each period for discontinuously transmitting the PDCCH includes an activation time period for transmitting the PDCCH and a sleep time period for stopping transmitting the PDCCH; and the configuration information is further configured to configure a first duration of the activation time period and a second duration of the sleep time period.

In some embodiments, the processing module is further configured to:

determine to initiate random access at a first time point, where the first time point is within the sleep time period configured by the first configuration information;

determine a target time point for initiating the random access; and where the apparatus further includes:

a transmission module, configured to transmit a random access request message to the base station at the target time point.

In some embodiments, the processing module is further configured to:

determine that a terminal service is a low latency service; and determine that the first time point is the target time point.

In some embodiments, the processing module is further configured to:

determine that a terminal service does not belong to a low latency service; and determine the target time point within the activation time period configured by the first configuration information.

In some embodiments, the processing module is further configured to determine to perform communication under a cellular network and establish a RRC connection with the base station at the first time point, and determine to initiate the random access at the first time point.

In some embodiments, the processing module is further configured to determine to switch from a wireless local area network to a cellular network for communication at the first time point, and determine to initiate the random access at the first time point.

According to a fifth aspect of embodiments of the present disclosure, a non-transitory computer readable storage medium is provided and has a computer program stored thereon, where the computer program is configured to implement any of the above methods for channel monitoring applied to the base side.

According to a sixth aspect of embodiments of the present disclosure, a non-transitory computer readable storage medium is provided and has a computer program stored thereon, where the computer program is configured to implement any of the above methods for channel monitoring applied to the terminal side.

According to a seventh aspect of embodiments of the present disclosure, a communication device is provided and includes a processor and a memory for storing instructions executable by the processor. The processor is configured to perform any of the above methods for channel monitoring applied to the base station side.

According to an eighth aspect of embodiments of the present disclosure, a communication device is provided and includes a processor, and memory for storing instructions executable by the processor. The processor is configured to perform any of the above methods for channel monitoring applied to the terminal side.

Technical solutions provided in the embodiments of the present disclosure may include the following beneficial effects:

In the embodiments of the present disclosure, the base station may first broadcast at least one configuration information, the configuration information is configured to configure one periodicity duration for discontinuously transmitting the physical downlink control channel PDCCH. Furthermore, after entering the energy-saving transmission mode for discontinuously transmitting the PDCCH, the base station transmits the first indication information to the terminal in the connected state, activates the first configuration information in the at least one configuration information through the first indication information. The terminal may discontinuously monitor the PDCCH based on the first configuration information. In the present disclosure, the base station may transmit the PDCCH discontinuously, so as to achieve the purpose of saving the energy consumption of the base station.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes may be made without departing from the scope thereof. It is intended that the scope of the embodiments of the present disclosure only be limited by the appended claims.

What is claimed is:

1. A method for channel monitoring, performed by a base station, comprising:

broadcasting at least one configuration information, wherein the configuration information is configured to configure one periodicity duration for discontinuously transmitting a physical downlink control channel (PDCCH); wherein a period for discontinuously transmitting the PDCCH comprises an activation time period for transmitting the PDCCH and a sleep time period for stopping transmitting the PDCCH; and the configuration information is further configured to configure a first duration of the activation time period and a second duration of the sleep time period:

determining to enter an energy-saving transmission mode for discontinuously transmitting the PDCCH; and transmitting first indication information to a terminal in a connected state, wherein the first indication information is configured to activate first configuration information in the at least one configuration information.

2. The method according to claim 1, further comprising:

determining to activate second configuration information in the at least one configuration information; and transmitting second indication information to the terminal in the connected state, wherein the second indication information is configured to activate the second configuration information.

3. The method according to claim 1, further comprising:

receiving downlink data transmitted by a core network device and corresponding to the terminal in the connected state;

determining, based on the first configuration information, transmission timing for transmitting the downlink data to the terminal in the connected state; and transmitting, based on the transmission timing, the downlink data to the terminal in the connected state.

4. The method according to claim 3, wherein determining, based on the first configuration information, the transmission timing for transmitting the downlink data to the terminal in the connected state comprises:

determining the transmission timing to be within the activation time period configured by the first configuration information.

5. The method according to claim 1, further comprising:

determining to be in the sleep time period configured by the first configuration information;

receiving a random access request message transmitted by a terminal not in a connected state;

determining that the sleep time period ends, and entering the activation time period configured by the first configuration information; and transmitting a random access response message to the terminal not in the connected state.

6. A method for channel monitoring, performed by a terminal, comprising:

receiving at least one configuration information broadcast by a base station, wherein the configuration information is configured to configure one periodicity duration for discontinuously transmitting a physical downlink control channel (PDCCH); wherein a period for discontinuously transmitting the PDCCH comprises an activation time period for transmitting the PDCCH and a sleep time period for stopping transmitting the PDCCH; and the configuration information is further configured to configure a first duration of the activation time period and a second duration of the sleep time period;

receiving first indication information transmitted by the base station, wherein the first indication information is configured to activate first configuration information in the at least one configuration information;

determining, based on the first indication information, that the base station enters an energy-saving transmission mode; and discontinuously monitoring, based on the first configuration information, the PDCCH.

7. The method according to claim 6, further comprising:

receiving second indication information transmitted by the base station, wherein the second indication information is configured to activate second configuration information; and discontinuously monitoring, based on the second configuration information, the PDCCH.

8. The method according to claim 6, further comprising:

determining to initiate random access at a first time point, wherein the first time point is within the sleep time period configured by the first configuration information;

determining a target time point for initiating the random access; and transmitting a random access request message to the base station at the target time point.

9. The method according to claim 8, wherein determining the target time point for initiating the random access comprises:

determining that a terminal service is a low latency service; and determining that the first time point is the target time point.

10. The method according to claim 8, wherein determining the target time point for initiating the random access comprises:

determining that a terminal service does not belong to a low latency service; and determining the target time point within the activation time period configured by the first configuration information.

11. The method according to claim 8, wherein determining to initiate the random access at the first time point comprises:

determining to perform communication under a cellular network and establishing a Radio Resource Control (RRC) connection with the base station at the first time point; and determining to initiate the random access at the first time point.

12. The method according to claim 8, wherein determining to initiate the random access at the first time point comprises:

determining to switch from a wireless local area network to a cellular network for communication at the first time point; and determining to initiate the random access at the first time point.

13. A communication device, comprising:

a processor;

a memory for storing instructions executable by the processor; wherein the processor is configured to:

broadcast at least one configuration information, wherein the configuration information is configured to configure one periodicity duration for discontinuously transmitting a physical downlink control channel (PDCCH); wherein a period for discontinuously transmitting the PDCCH comprises an activation time period for transmitting the PDCCH and a sleep time period for stopping transmitting the PDCCH; and the configuration information is further configured to configure a first duration of the activation time period and a second duration of the sleep time period;

determine to enter an energy-saving transmission mode for discontinuously transmitting the PDCCH; and transmit first indication information to a terminal in a connected state, wherein the first indication information is configured to activate first configuration information in the at least one configuration information.

14. A communication device, comprising:

a processor;

a memory for storing instructions executable by the processor; wherein the processor is configured to perform the method for channel monitoring according to claim 6.

15. The communication device according to claim 13, wherein the processor is further configured to:

determine to activate second configuration information in the at least one configuration information; and transmit second indication information to the terminal in the connected state, wherein the second indication information is configured to activate the second configuration information.

16. The communication device according to claim 13, wherein the processor is further configured to:

receive downlink data transmitted by a core network device and corresponding to the terminal in the connected state;

determine, based on the first configuration information, transmission timing for transmitting the downlink data to the terminal in the connected state; and transmit, based on the transmission timing, the downlink data to the terminal in the connected state.

17. The communication device according to claim 16, wherein the processor is further configured to:

determine the transmission timing to be within the activation time period configured by the first configuration information.

* * * * *